United States Patent
Okado et al.

(10) Patent No.: US 12,384,542 B2
(45) Date of Patent: Aug. 12, 2025

(54) MOVING OBJECT

(71) Applicant: HONDA MOTOR CO., LTD., Tokyo (JP)

(72) Inventors: Michihito Okado, Wako (JP); Victor Alcahud Guim, Wako (JP); Takao Kanki, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 0 days.

(21) Appl. No.: 18/424,044

(22) Filed: Jan. 26, 2024

(65) Prior Publication Data
US 2024/0262507 A1  Aug. 8, 2024

(30) Foreign Application Priority Data
Feb. 2, 2023 (JP) .................. 2023-014320

(51) Int. Cl.
*B64D 11/06* (2006.01)
(52) U.S. Cl.
CPC ...... *B64D 11/0601* (2014.12); *B64D 11/0638* (2014.12)
(58) Field of Classification Search
CPC ............ B64D 11/0601; B64D 11/0638; B64D 11/0605; B64D 11/0606; B64D 11/06; B60N 2/01
See application file for complete search history.

(56) References Cited

U.S. PATENT DOCUMENTS

| | | | |
|---|---|---|---|
| 2,710,731 A * | 6/1955 | Bright | B64D 11/0023 244/118.6 |
| 10,919,631 B2 * | 2/2021 | Scoley | B64C 1/143 |
| 11,136,105 B2 * | 10/2021 | Moore | B64C 1/1438 |
| 2009/0050740 A1 | 2/2009 | Saint-Jalmes et al. | |
| 2009/0173825 A1 * | 7/2009 | Dehn | B64C 1/1438 244/129.5 |
| 2018/0312082 A1 * | 11/2018 | Lalague | B60N 2/01 |
| 2019/0039712 A1 * | 2/2019 | Moore | B64D 11/0601 |
| 2020/0130837 A1 * | 4/2020 | Scoley | B64D 11/00 |

FOREIGN PATENT DOCUMENTS

| | | |
|---|---|---|
| CN | 108791502 A | 11/2018 |
| EP | 3 378 770 A1 | 9/2018 |

OTHER PUBLICATIONS

Extended European Search Report dated Jul. 2, 2024 issued in corresponding European Application No. 24155158.9; 6 pages.

* cited by examiner

*Primary Examiner* — Justin M Benedik
(74) *Attorney, Agent, or Firm* — Rankin, Hill & Clark LLP

(57) ABSTRACT

A moving object includes a passenger cabin. The passenger cabin is defined by a first side wall and a second side wall. The first side wall is formed with a doorway through which passengers can enter and exit the passenger cabin. The moving object further includes a first seat disposed between a center line LA and the second side wall so as to face forward, the center line extending in a region between the first side wall and the second side wall, and a second seat disposed between the center line and the second side wall and disposed rearward of the first seat so as to face rearward. At least a part of the first seat and at least a part of the second seat overlap the doorway in a side view.

15 Claims, 4 Drawing Sheets

MOVING OBJECT

CROSS-REFERENCE TO RELATED APPLICATIONS

This application is based upon and claims the benefit of priority from Japanese Patent Application No. 2023-014320 filed on Feb. 2, 2023, the contents of which are incorporated herein by reference.

BACKGROUND OF THE INVENTION

Field of the Invention

The present disclosure relates to a moving object.

Description of the Related Art

Moving objects such as an eVTOL (electronic Vertical Take-Off and Landing aircraft) that carries passengers are known. U.S. Pat. No. 11,136,105 B2 discloses an eVTOL interior.

SUMMARY OF THE INVENTION

A more suitable moving object is desired.

An object of the present invention is to solve the above-mentioned problem.

A first aspect of the present invention is a moving object including a passenger cabin, wherein the passenger cabin is defined by a first side wall positioned on one side with respect to a center line of the moving object and a second side wall positioned on another side with respect to the center line, the center line extending in a front-rear direction, a doorway through which a passenger enters and exits the passenger cabin is formed in the first side wall, wherein the moving object further includes: a first seat positioned between the center line and the second side wall and disposed to face forward; and a second seat positioned between the center line and the second side wall, and rearward of the first seat, the second seat being disposed to face rearward, and wherein at least a part of the first seat and at least a part of the second seat overlap the doorway in a side view.

According to the present invention, a more suitable moving object is provided.

The above and other objects features and advantages of the present invention will become more apparent from the following description when taken in conjunction with the accompanying drawings in which a preferred embodiment of the present invention is shown by way of illustrative example.

DETAILED DESCRIPTION OF THE INVENTION

The eVTOL according to U.S. Pat. No. 11,136,105 B2 is provided with a plurality of passenger seats. The plurality of passenger seats are densely arranged. In this case, the passengers' eyes are likely to meet with each other. As a result, the passengers may feel some other passenger watching her/him, and may not be able to get relaxed sufficiently.

With the above situation in mind, an embodiment is described below.

Embodiment

Figure 1:
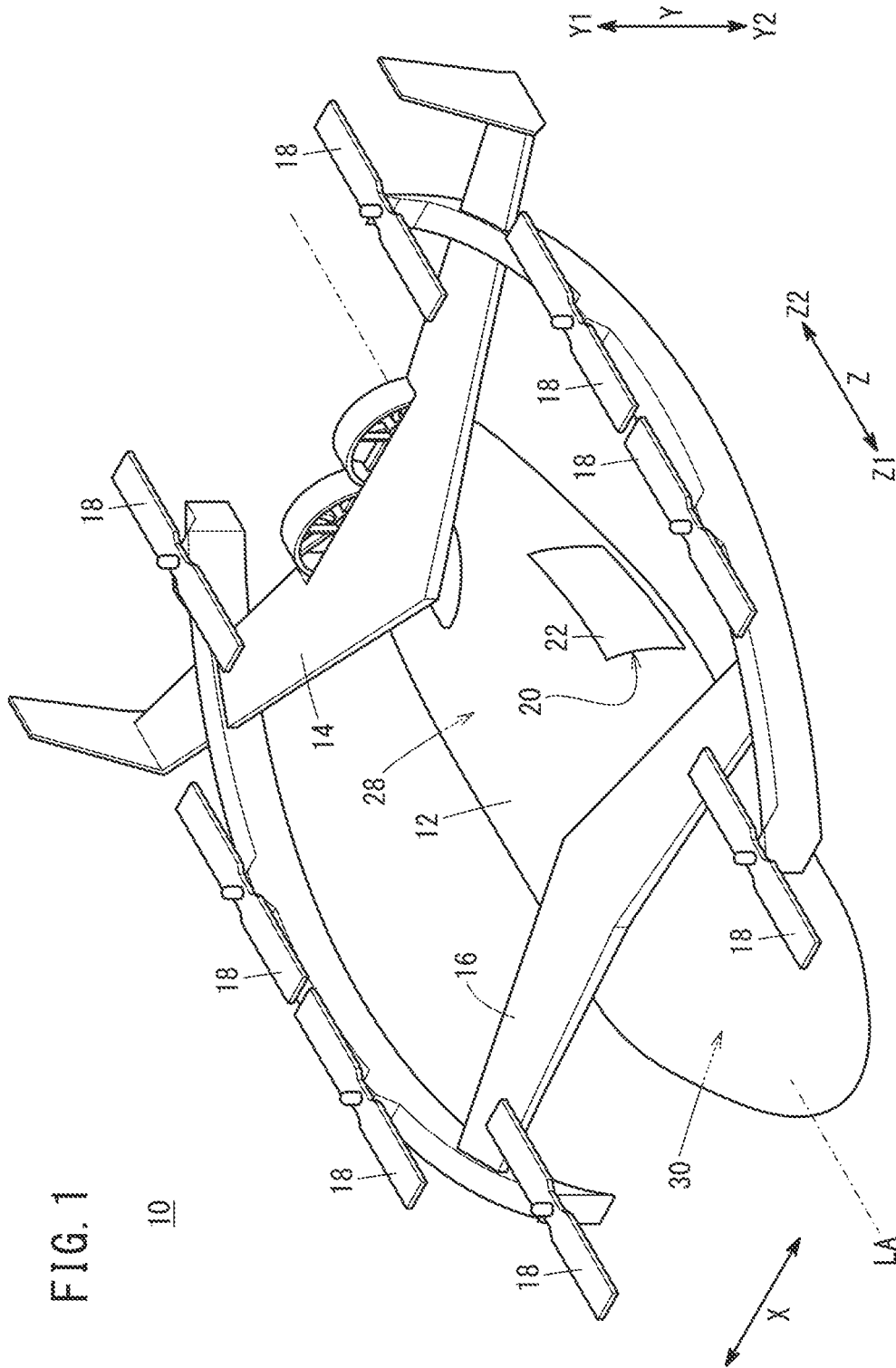
FIG. 1 is a perspective view of a moving object according to an embodiment.

FIG. 1 is a perspective view of a moving object 10 according to the present embodiment. Note that FIG. 1 shows a front-rear direction Z (Z1, Z2), a vertical direction Y (Y1, Y2), and a widthwise direction X. The front-rear direction Z, the vertical direction Y, and the widthwise direction X are orthogonal to each other. The downward direction Y2 indicates the gravity direction.

The moving object 10 is a vehicle that carries passengers. In the present embodiment, a case where the moving object 10 is an eVTOL will be described, but the present invention is not limited thereto. Note that the eVTOL belongs to an aircraft.

The moving object 10 includes a fuselage (body) 12. The moving object 10, which is an eVTOL, may further include a main wing 14, which is a fixed wing, a front wing 16 disposed forward of the main wing 14, and a plurality of electric rotary wings 18, but detailed description thereof will be omitted.

A doorway (entrance/exit) 20 is formed in the fuselage 12. The doorway 20 is an opening formed such that passengers and crews can get on and off the moving object 10. The number of the doorways 20 formed in the fuselage 12 is preferably one, but is not limited thereto. By minimizing the number of the doorways 20, the weight of the moving object 10 can be suppressed.

The doorway 20 is provided with a doorway door 22 so as to be openable and closable. When the doorway door 22 is in an open state, passengers are allowed to get on and off the moving object 10 via the doorway 20. When the doorway door 22 is in a closed state, passengers are prohibited from getting on and off the moving object 10 via the doorway 20. The doorway door 22 shown in FIG. 1 is in a closed state. The doorway door 22 is opened and closed by sliding in the front-rear direction Z, for example, but is not limited thereto. The doorway door 22 may be a single swing door or a double swing door.

The fuselage 12 further includes a passenger cabin 28 and a cockpit 30. The passenger cabin 28 and the cockpit 30 are formed inside the fuselage 12.

Figure 2:
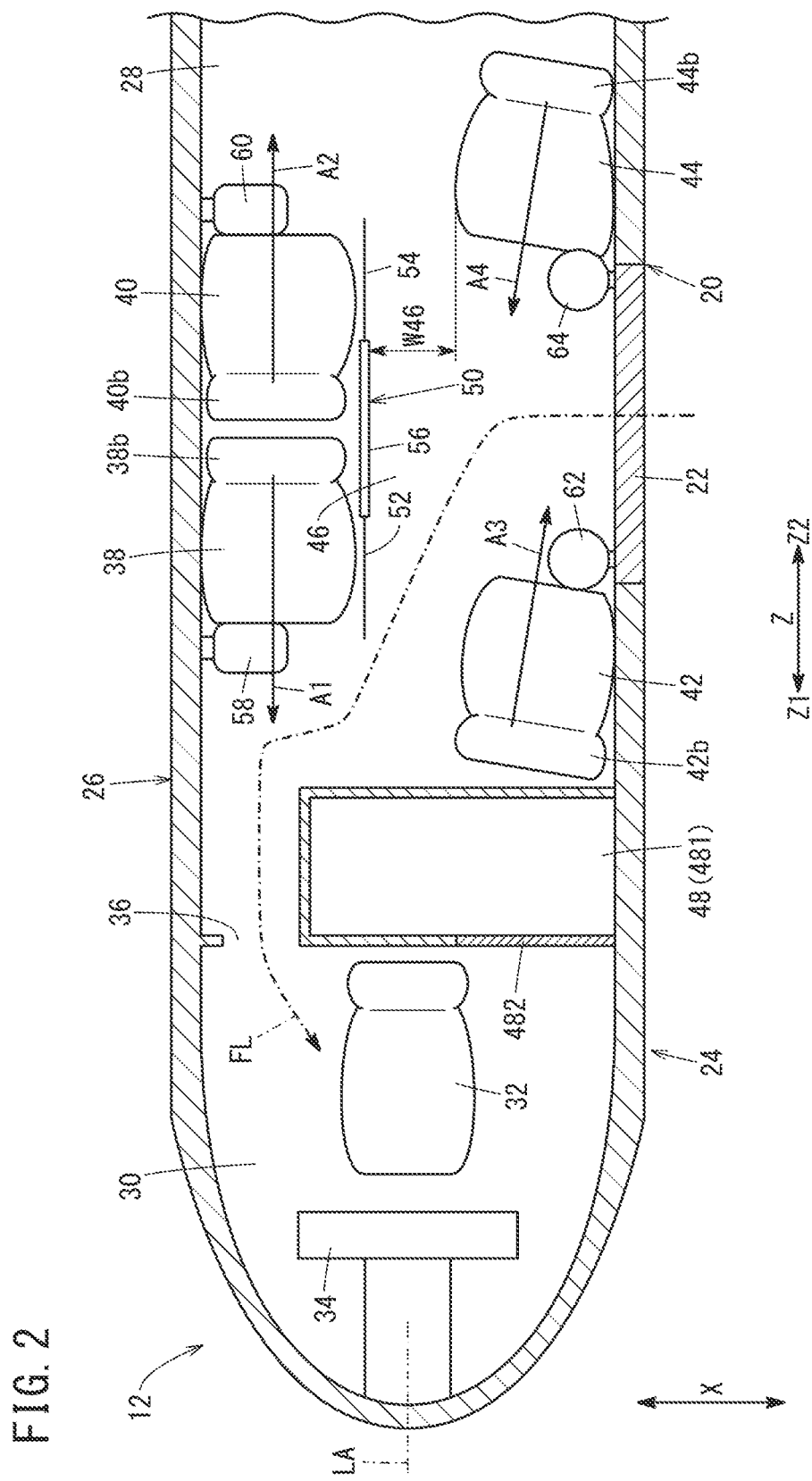
FIG. 2 is a top view looking down on a passenger cabin and a cockpit.
Figure 3:
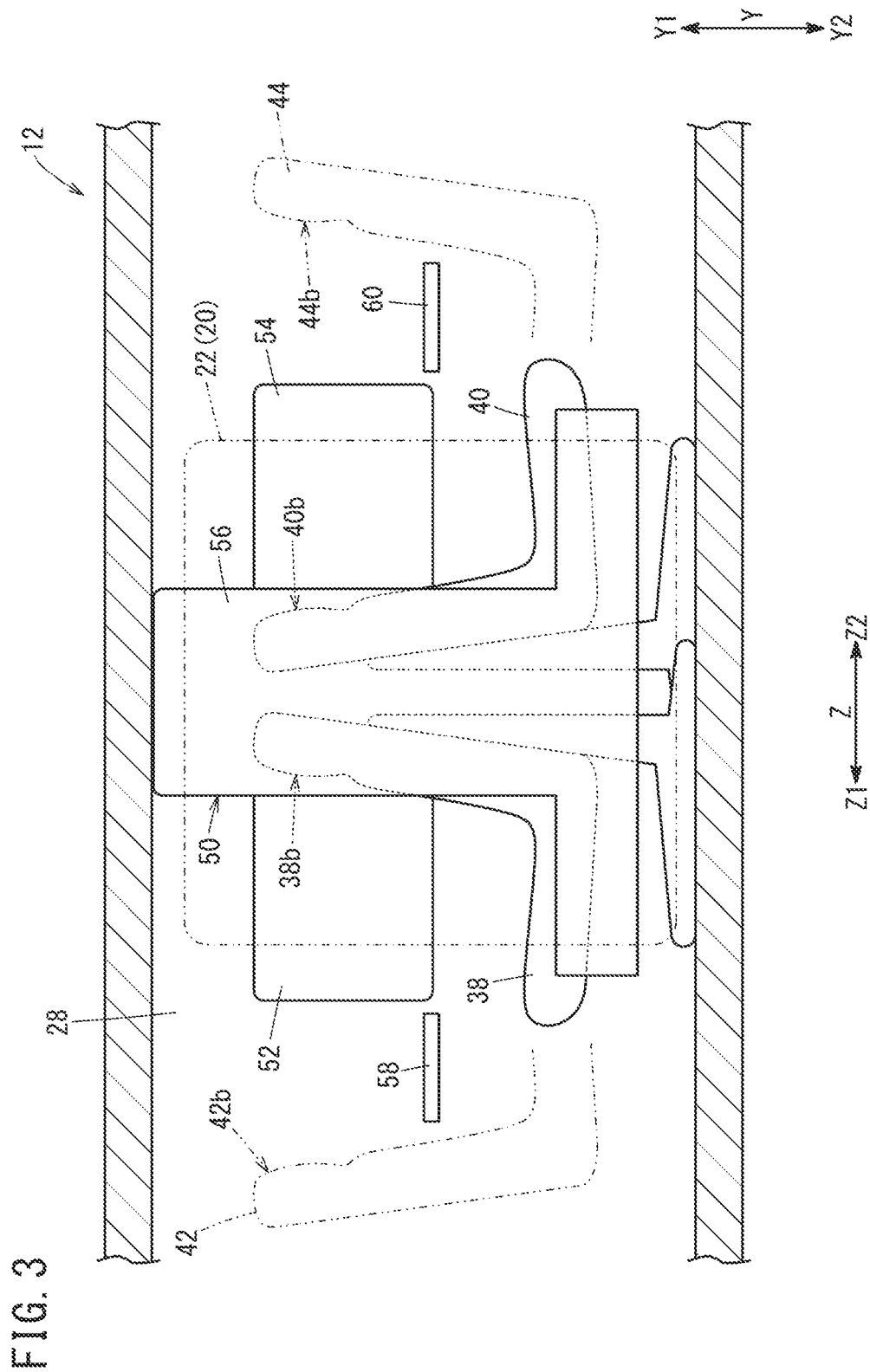
FIG. 3 is a view showing a shielding device provided in the passenger cabin.

FIG. 2 is a top view looking down on the passenger cabin 28 and the cockpit 30. FIG. 3 is a view showing a shielding device 50 provided in the passenger cabin 28.

The fuselage 12 has a first side wall 24 and a second side wall 26. The first side wall 24 is a side wall positioned on one side with respect to the center line LA of the fuselage 12 (the moving object 10). The second side wall 26 is a side wall located on the other side with respect to the center line LA. The first side wall 24 and the second side wall 26 define the passenger cabin 28 provided in the moving object 10. Although not shown, one or more windows may be provided in the first side wall 24 and the second side wall 26 as appropriate. The center line LA is parallel to the front-rear direction Z (see also FIG. 1).

The doorway 20 described above is formed in the first side wall 24 of the fuselage 12. Passengers can get on the moving object 10 through the doorway 20 to enter the passenger cabin 28.

The cockpit 30 is located in front of the passenger cabin 28, but is not limited thereto. The cockpit 30 includes, for example, a pilot's seat 32 and an operation panel 34. A crew who operates the moving object 10 sits on the pilot's seat 32. The operation panel 34 is operated to operate the moving object 10.

The cockpit 30 and the passenger cabin 28 communicate with each other via a communication passage 36. The crew can move between the cockpit 30 and the passenger cabin 28 through the communication passage 36. With this configuration, it is not necessary to provide a doorway dedicated for the crew, separately from the above-described doorway 20. A door may be provided for the communication passage 36.

The communication passage 36 is preferably located between a center aisle 46 described later and the first side wall 24 or between the center aisle 46 and the second side wall 26. The reason for this will be described later. In the present embodiment, the communication passage 36 is located between the center aisle 46 and the second side wall 26.

The passenger cabin 28 is provided with a first seat 38, a second seat 40, a third seat 42, and a fourth seat 44. The first seat 38 is a seat on which a first passenger sits. The second seat 40 is a seat on which a second passenger sits. The third seat 42 is a seat on which a third passenger sits. The fourth seat 44 is a seat on which a fourth passenger sits. A power machine room (not shown) can be provided behind the passenger cabin 28. The power machine room can include equipment for driving the moving object 10. The equipment may include, for example, an engine, a motor for power generation, a battery, and the like.

The passenger cabin 28 also has the center aisle 46. The center aisle 46 extends along the center line LA. In the present embodiment, the center line of the center aisle 46 and the center line LA coincide with each other, but the present invention is not limited thereto.

The crew can pass through the center aisle 46 to reach the communication passage 36 described above.

When the communication passage 36 is located between the center aisle 46 and the first side wall 24 or between the center aisle 46 and the second side wall 26, the position of the communication passage 36 in the widthwise direction X is different from the position of the center aisle 46 in the widthwise direction X. Accordingly, a part of the flow line FL of the crew moving from the doorway 20 to the cockpit 30 deviates from the center aisle 46 (see also FIG. 2). With this configuration, the crew cannot reach the cockpit 30 by simply moving in the forward direction Z1 along the center aisle 46. As a result, the possibility that the passengers may stray into the cockpit 30 is reduced.

As described above, in the present embodiment, the communication passage 36 is located between the center line LA and the second side wall 26. A space 48 may be formed between the communication passage 36 and the first side wall 24.

The space 48 may be used as a machine room 481. The machine room 481 is provided with, for example, a control computer for controlling the moving object 10. The space 48 may be used as a storage space for storing luggage of passengers. A door 482 for the space 48 (machine room 481) may be provided in the cockpit 30, for example, but is not limited thereto.

The first seat 38 and the second seat 40 are located between the center line LA and the second side wall 26. More specifically, the first seat 38 and the second seat 40 are located between the center aisle 46 and the second side wall 26. The first seat 38 is arranged to face forward. The second seat 40 is disposed rearwardly of the first seat 38 to face rearward.

With this configuration, the first passenger seated on the first seat 38 and the second passenger seated on the second seat 40 do not face each other. Therefore, the first passenger's eyes and the second passenger's eyes are unlikely to meet. Note that an arrow A1 indicating the orientation of the first seat 38 and an arrow A2 indicating the orientation of the second seat 40 are shown in FIG. 2. The orientation of the first seat 38 can be specified by the orientation of a backrest 38*b* of the first seat 38. The orientation of the second seat 40 can be specified by the orientation of a backrest 40*b* of the second seat 40.

At least a part of the first seat 38 overlaps the doorway 20 in a side view. At least a part of the second seat 40 also overlaps the doorway 20 in the side view.

With this configuration, the first passenger and the second passenger can enter and exit the passenger cabin 28 via the doorway 20 without caring about each other's eyes. That is, the doorway 20 and the first seat 38 are separated from each other in the widthwise direction X and overlap each other in a side view. With this configuration, the doorway 20 is easily in the blind spot of the first passenger seated on the first seat 38. Thus, when the first passenger is seated in the first seat 38, the second passenger can enter and exit the passenger cabin 28 through the doorway 20 without caring about the first passenger's eyes. The doorway 20 and the second seat 40 are separated from each other in the widthwise direction X and overlap each other in a side view. With this configuration, the doorway 20 is easily in the blind spot of the second passenger seated on the second seat 40. Thus, when the second passenger is seated in the second seat 40, the first passenger can enter and exit the passenger cabin 28 through the doorway 20 without caring about the second passenger's eyes.

The third seat 42 and the fourth seat 44 are located between the center line LA and the first side wall 24. More specifically, the third seat 42 and the fourth seat 44 are located between the center aisle 46 and the first side wall 24. The third seat 42 is positioned on the front side of the doorway 20. On the other hand, the fourth seat 44 is positioned on the rear side of the doorway 20.

The orientation of the third seat 42 in the top view is obliquely rearward. On the other hand, the orientation of the fourth seat 44 in the top view is obliquely forward. Note that an arrow A3 indicating the orientation of the third seat 42 and an arrow A4 indicating the orientation of the fourth seat 44 are shown in FIG. 2. The orientation of the third seat 42 can be specified by the orientation of a backrest 42*b* of the third seat 42. The orientation of the fourth seat 44 can be specified by the orientation of a backrest 44*b* of the fourth seat 44. The position of the third seat 42 in the widthwise direction X is the same as the position of the fourth seat 44 in the widthwise direction X.

With this configuration, the third passenger seated on the third seat 42 and the fourth passenger seated on the fourth seat 44 are unlikely to face each other. Therefore, the third passenger' eyes and the fourth passenger's eyes are unlikely to meet.

It is preferable that one of the third seat 42 and the fourth seat 44 is inclined toward the first side wall 24 in a top view, and the other of the third seat 42 and the fourth seat 44 is inclined toward the second side wall 26 in the top view.

With this configuration, the legs of the third passenger seated on the third seat 42 and the legs of the fourth passenger seated on the fourth seat 44 are less likely to interfere with each other. FIG. 2 shows the third seat 42 inclined toward the first side wall 24 in a top view and the fourth seat 44 inclined toward the second side wall 26 in the top view.

As mentioned above, the center aisle 46 is located between the first seat 38 and the third seat 42. Therefore, the distance between the first seat 38 and the third seat 42 in the widthwise direction X is at least equal to or larger than the width W46 of the center aisle 46.

Thus, the third passenger seated in the third seat 42 is less likely to be in the field of view of the first passenger seated in the first seat 38. Similarly, the first passenger seated in the first seat 38 is less likely to be in the field of view of the third passenger seated in the third seat 42. Therefore, the first passenger's eyes and the third passenger's eyes are less likely to meet.

It is more preferable that at least a part of the first seat 38 and at least a part of the third seat 42 overlap each other in a side view. This makes it easier for the third passenger to be in the blind spot of the first passenger, and makes it easier for the first passenger to be in the blind spot of the third passenger. As a result, the possibility that the first passenger's eyes and the third passenger's eyes may meet is further reduced.

As described above, the third seat 42 is positioned in front of the doorway 20 and faces obliquely rearward. Therefore, the third passenger who has entered the passenger cabin 28 through the doorway 20 can sit on the third seat 42 without going around to the front of the third seat 42. In other words, the third passenger can sit in the third seat 42 without passing by the first seat 38.

In this way, the third passenger is less likely to be in the field of view of the first passenger seated in the first seat 38.

As mentioned above, the center aisle 46 is located between the second seat 40 and the fourth seat 44. Therefore, the distance between the second seat 40 and the fourth seat 44 in the widthwise direction X is at least equal to or greater than the width of the center aisle 46.

In this way, the fourth passenger seated on the fourth seat 44 is less likely to be in the field of view of the second passenger seated on the second seat 40. Similarly, the second passenger seated in the second seat 40 is less likely to be in the field of view of the fourth passenger seated in the fourth seat 44. Therefore, the second passenger's eyes and the fourth passenger's eyes are less likely to meet.

It is more preferable that at least a part of the second seat 40 and at least a part of the fourth seat 44 overlap each other in the side view. This makes it easier for the fourth passenger to be in the blind spot of the second passenger, and makes it easier for the second passenger to be in the blind spot of the fourth passenger. As a result, the possibility that the second passenger's eyes and the fourth passenger's eyes may meet is further reduced.

As described above, the fourth seat 44 is positioned rearward of the doorway 20 and faces obliquely forward. Therefore, the fourth passenger who has entered the passenger cabin 28 through the doorway 20 can sit on the fourth seat 44 without going around to the rear of the fourth seat 44. In other words, the fourth passenger can sit on the fourth seat 44 without passing by the second seat 40.

In this way, the fourth passenger is less likely to be in the field of view of the second passenger seated in the second seat 40.

Moreover, since the third passenger does not need to go around to the front of the third seat 42 when sitting on the third seat 42, it is not necessary to add a passage between the third seat 42 and the first side wall 24. Similarly, since the fourth passenger does not need to go around to the rear of the fourth seat 44 when sitting on the fourth seat 44, it is not necessary to add a passage between the fourth seat 44 and the first side wall 24. As a result, it is possible to suppress an increase in the dimension of the fuselage 12 in the widthwise direction X due to the addition of the passage.

Figure 4:
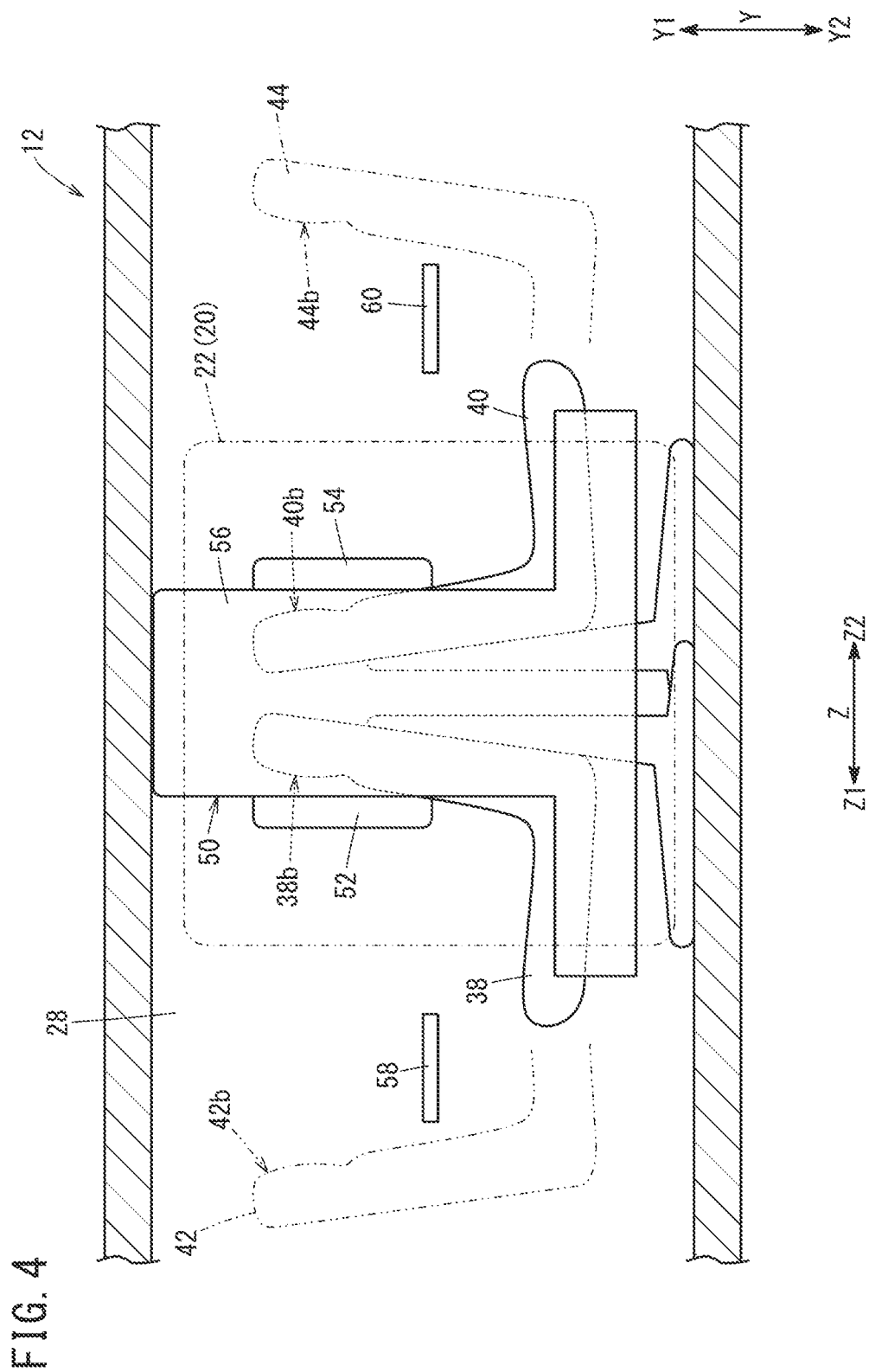
FIG. 4 is a view showing a shielding device provided in the passenger cabin.

FIG. 4 is a view showing a shielding device 50 provided in the passenger cabin 28.

The moving object 10 further includes a shielding device 50. The shielding device 50 includes a first partition 52, a second partition 54, and a main body 56. The first partition 52 is a partition for shielding between the first seat 38 and the third seat 42. The second partition 54 is a partition for shielding between the second seat 40 and the fourth seat 44. The first partition 52 and the second partition 54 can be retracted in the main body 56. FIG. 4 shows the shielding device 50 with the first partition 52 and the second partition 54 retracted in the main body 56.

The main body 56 includes a housing capable of accommodating the first partition 52 and the second partition 54, and an actuator (not shown). The actuator deploys (projects) the first partition 52. That is, the first partition 52 accommodated in the main body 56 moves in the front direction Z1 in response to the driving of the actuator.

As a result, as shown in FIGS. 2 and 3, the first partition 52 shields between the first seat 38 and the third seat 42. As a result, the possibility that the first passenger's eyes and the third passenger's eyes may meet is further reduced. The first partition 52 positioned between the first seat 38 and the third seat 42 can be accommodated in the main body 56 again by moving in the rearward direction Z2 in response to the driving of the actuator.

The second partition 54 is also deployed (projected) by an actuator (not shown) provided in the main body 56. That is, the second partition 54 accommodated in the main body 56 moves in the rearward direction Z2 in response to the driving of the actuator.

As a result, as shown in FIGS. 2 and 3, the second partition 54 shields between the second seat 40 and the fourth seat 44. As a result, the possibility that the second passenger's eyes and the fourth passenger's eyes may meet is further reduced. The second partition 54 positioned between the second seat 40 and the fourth seat 44 can be accommodated in the main body 56 again by moving in the front direction Z1 in response to the driving of the actuator.

The actuator provided in the main body 56 includes, for example, a motor, but is not limited thereto. The actuator can be controlled by a computer (not shown). The computer (not shown) may be provided in the moving object 10. The actuator may be driven in response to operation of a switch appropriately disposed around the first seat 38 or the second seat 40. A first actuator for moving the first partition 52 and a second actuator for moving the second partition 54 may be provided in the main body 56. In addition, one of the first partition 52 and the second partition 54 may be omitted.

As shown in FIG. 2, the moving object 10 further includes a first table 58, a second table 60, a third table 62, and a fourth table 64. Each of the first table 58 and the second table 60 is, for example, a rectangular table, but is not limited thereto. Each of the third table 62 and the fourth table 64 is a circular table, but is not limited thereto. At least one of the first table 58, the second table 60, the third table 62, or the fourth table 64 may be omitted.

The first table 58 is a table used by the first passenger. The second table 60 is a table used by the second passenger. Each of the first table 58 and the second table 60 is, for example, a folding table that can be accommodated in the second side wall 26.

The second side wall 26 is provided with an accommodation portion (first accommodation portion) (not shown) capable of accommodating the first table 58. The first accommodation portion is, for example, a concave portion capable of accommodating the folded first table 58.

The second side wall 26 is provided with an accommodation portion (second accommodation portion) (not shown) capable of accommodating the second table 60. The second accommodation portion is, for example, a concave portion capable of accommodating the folded second table 60.

The third table 62 is a table used by the third passenger. The fourth table 64 is a table used by the fourth passenger. Each of the third table 62 and the fourth table 64 is, for example, a folding table that can be accommodated in the doorway door 22.

The doorway door 22 or the first side wall 24 is provided with an accommodation portion (third accommodation portion) (not shown) capable of accommodating the third table 62. The third accommodation portion is, for example, a concave portion capable of accommodating the folded third table 62.

Further, the doorway door 22 or the first side wall 24 is provided with an accommodation portion (fourth accommodation portion) (not shown) capable of accommodating the fourth table 64. The fourth accommodation portion is, for example, a concave portion capable of accommodating the folded fourth table 64.

The third table 62 and the fourth table 64 may be attached to the first side wall 24.

APPENDIXES

With respect to the above disclosure, the following appendixes are further disclosed.

Appendix 1

The moving object (10) according to the present disclosure includes the passenger cabin (28). The passenger cabin is defined by the first side wall (24) positioned on one side with respect to the center line (LA) of the moving object and the second side wall (26) positioned on another side with respect to the center line, the center line extending in the front-rear direction (Z). The doorway (20) through which a passenger enters and exits the passenger cabin is formed in the first side wall. The moving object further includes: the first seat (38) located between the center line and the second side wall and disposed to face forward; and the second seat (40) positioned between the center line and the second side wall and disposed rearward of the first seat, the second seat being disposed to face rearward. At least a part of the first seat and at least a part of the second seat overlap the doorway in a side view. Thus, the first passenger seated on the first seat and the second passenger seated on the second seat do not face each other. Therefore, the first passenger's eyes and the second passenger's eyes are unlikely to meet.

Appendix 2

The moving object according to Appendix 1 may further include the third seat (42) disposed between the center line and the first side wall, and on the front side of the doorway; and the fourth seat (44) disposed between the center line and the first side wall, and on the rear side of the doorway, wherein the third seat may face obliquely rearward in the top view, and the fourth seat may face obliquely forward in the top view. With this configuration, the third passenger is less likely to be in the field of view of the first passenger seated on the first seat, and the fourth passenger is less likely to be in the field of view of the second passenger seated on the second seat.

Appendix 3

In the moving object according to Appendix 2, one of the third seat and the fourth seat may be inclined toward the first side wall in the top view, and another of the third seat and the fourth seat may be inclined toward the second side wall in the top view. With this configuration, the legs of the third passenger seated on the third seat and the legs of the fourth passenger seated on the fourth seat are less likely to interfere with each other.

Appendix 4

The moving object according to any one of Appendixes 1 to 3 may further include the partition (52, 54) disposed at least one of between the first seat and the third seat or between the second seat and the fourth seat. This further reduces the possibility that the first passenger's eyes and the third passenger's eyes can meet, and further reduces the possibility that the second passenger's eyes and the fourth passenger's eyes can meet.

Appendix 5

In the moving object according to any one of Appendixes 1 to 4, the passenger cabin may include the aisle extending along the center line, the moving object may further include the cockpit (30) disposed forward of the passenger cabin and communicating with the passenger cabin via the communication passage (36), and the position of the aisle in the widthwise direction (X) orthogonal to the front-rear direction may be different from the position of the communication passage in the widthwise direction. Thus, the passenger doorway and the crew doorway are consolidated into one doorway, and the possibility that the passenger may get lost into the cockpit is reduced.

Appendix 6

In the moving object according to any one of Appendixes 1 to 5, at least one of the first table (58) used by a passenger seated on the first seat or the second table (60) used by a passenger seated on the second seat may be attached to the second side wall. This can give facilities to passengers.

Appendix 7

The moving object according to any one of Appendixes 1 to 6 may further include the doorway door (22) provided at the doorway, and at least one of the third table (62) used by a passenger seated on the third seat or the fourth table (64) used by a passenger seated on the fourth seat may be accommodated in the doorway door so as to be extractable. Thus, the third table and the fourth table do not hinder the passengers and the crew from getting on and off the moving object through the doorway.

Appendix 8

In the moving object according to any one of Appendixes 1 to 7, the moving object may be an aircraft. The aircraft is, for example, an eVTOL, a small jet (airplane), a helicopter, or the like.

Moreover, it should be noted that the present invention is not limited to the disclosure described above, but various configurations may be adopted therein without departing from the essence and gist of the present invention.

The invention claimed is:

1. A moving object comprising a passenger cabin, wherein the passenger cabin is defined by a first side wall positioned on one side with respect to a center line of the moving object and a second side wall positioned on another side with respect to the center line, the center line extending in a front-rear direction,
a doorway through which a passenger enters and exits the passenger cabin is formed in the first side wall,
wherein the moving object further comprises:
a first seat positioned between the center line and the second side wall and disposed to face forward; and
a second seat positioned between the center line and the second side wall, and rearward of the first seat, the second seat being disposed to face rearward, and
wherein at least a part of the first seat and at least a part of the second seat overlap the doorway in a side view so that the doorway is in a blind spot of a first passenger facing forward in the first seat and a second passenger facing rearward in the second seat.

2. The moving object according to claim 1, further comprising:
a third seat disposed between the center line and the first side wall, and on a front side of the doorway; and
a fourth seat disposed between the center line and the first side wall, and on a rear side of the doorway,
wherein
the third seat faces obliquely rearward in a top view, and the fourth seat faces obliquely forward in the top view.

3. The moving object according to claim 2, wherein one of the third seat and the fourth seat is inclined toward the first side wall in the top view, and
another of the third seat and the fourth seat is inclined toward the second side wall in the top view.

4. The moving object according to claim 2, further comprising:
a partition disposed at least one of between the first seat and the third seat or between the second seat and the fourth seat.

5. The moving object according to claim 2, further comprising:
a doorway door provided at the doorway,
wherein at least one of a third table used by a passenger seated on the third seat or a fourth table used by a passenger seated on the fourth seat is accommodated in the doorway door so as to be extractable.

6. The moving object according to claim 1, wherein at least one of a first table used by a passenger seated on the first seat or a second table used by a passenger seated on the second seat is attached to the second side wall.

7. The moving object according to claim 1, wherein the moving object is an aircraft.

8. The moving object according to claim 1, wherein the passenger cabin includes an aisle extending along the center line,
the moving object further comprises a cockpit disposed forward of the passenger cabin and communicating with the passenger cabin via a communication passage, and
a position of the aisle in a widthwise direction orthogonal to the front-rear direction is different from a position of the communication passage in the widthwise direction.

9. A moving object comprising a passenger cabin, wherein the passenger cabin is defined by a first side wall positioned on one side with respect to a center line of the moving object and a second side wall positioned on another side with respect to the center line, the center line extending in a front-rear direction,
the passenger cabin includes an aisle extending along the center line,
a doorway through which a passenger enters and exits the passenger cabin is formed in the first side wall,
the moving object further comprises:
a first seat positioned between the center line and the second side wall and disposed to face forward;
a second seat positioned between the center line and the second side wall, and rearward of the first seat, the second seat being disposed to face rearward; and
a cockpit disposed forward of the passenger cabin and communicating with the passenger cabin via a communication passage,
at least a part of the first seat and at least a part of the second seat overlap the doorway in a side view, and
a position of the aisle in a widthwise direction orthogonal to the front-rear direction is different from a position of the communication passage in the widthwise direction.

10. The moving object according to claim 9, further comprising:
a third seat disposed between the center line and the first side wall, and on a front side of the doorway; and
a fourth seat disposed between the center line and the first side wall, and on a rear side of the doorway,
wherein
the third seat faces obliquely rearward in a top view, and the fourth seat faces obliquely forward in the top view.

11. The moving object according to claim 10, wherein one of the third seat and the fourth seat is inclined toward the first side wall in the top view, and
another of the third seat and the fourth seat is inclined toward the second side wall in the top view.

12. The moving object according to claim 10, further comprising:
a partition disposed at least one of between the first seat and the third seat or between the second seat and the fourth seat.

13. The moving object according to claim 10, further comprising:
a doorway door provided at the doorway,
wherein at least one of a third table used by a passenger seated on the third seat or a fourth table used by a passenger seated on the fourth seat is accommodated in the doorway door so as to be extractable.

14. The moving object according to claim 9, wherein at least one of a first table used by a passenger seated on the first seat or a second table used by a passenger seated on the second seat is attached to the second side wall.

15. The moving object according to claim 9, wherein the moving object is an aircraft.

* * * * *